W. B. SWINDELL.
MOTION PICTURE FILM REEL MECHANISM.
APPLICATION FILED JUNE 19, 1909.
970,570.
Patented Sept. 20, 1910.
2 SHEETS—SHEET 1.
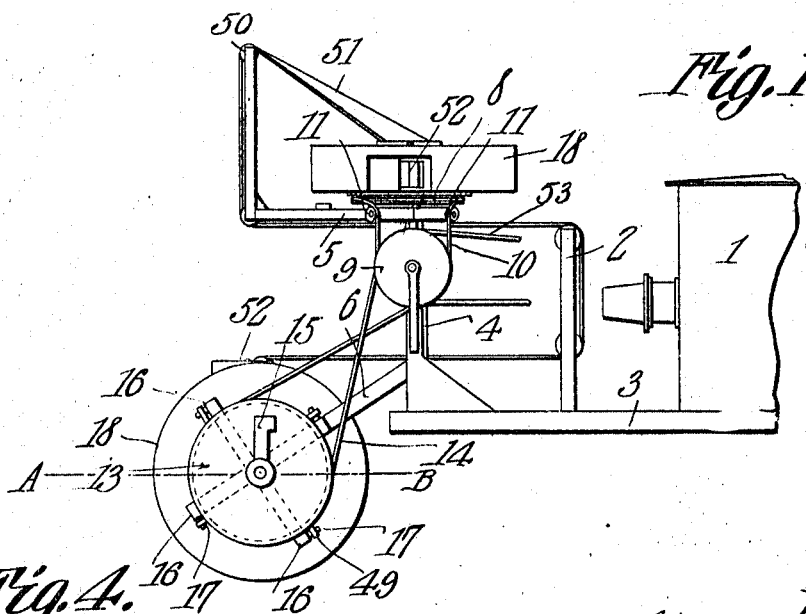
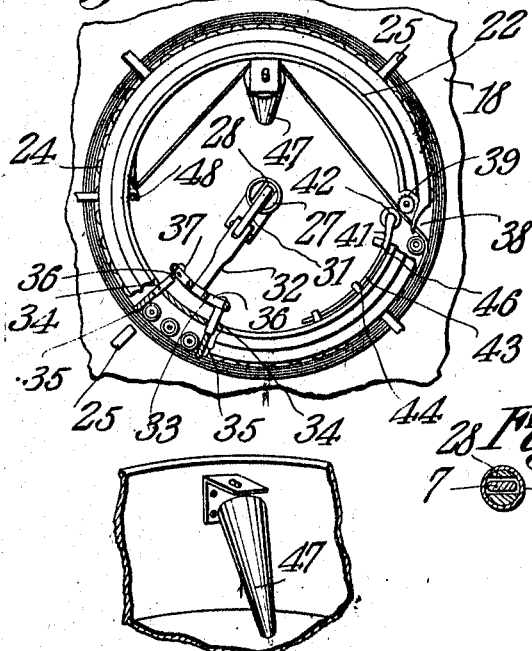
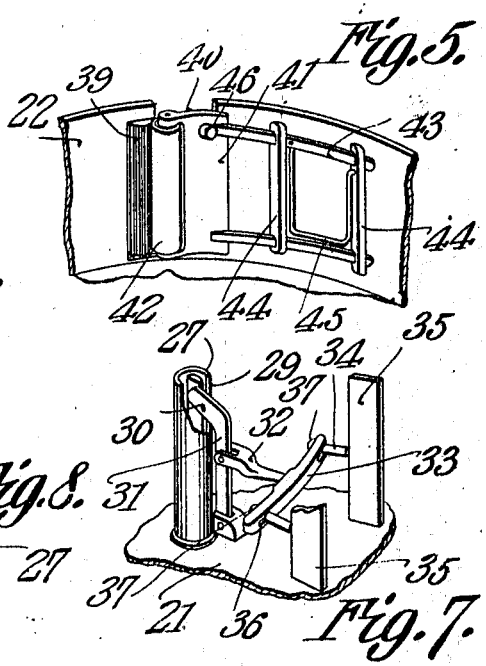
Witnesses
Inventor
Walter B. Swindell.
Attorneys

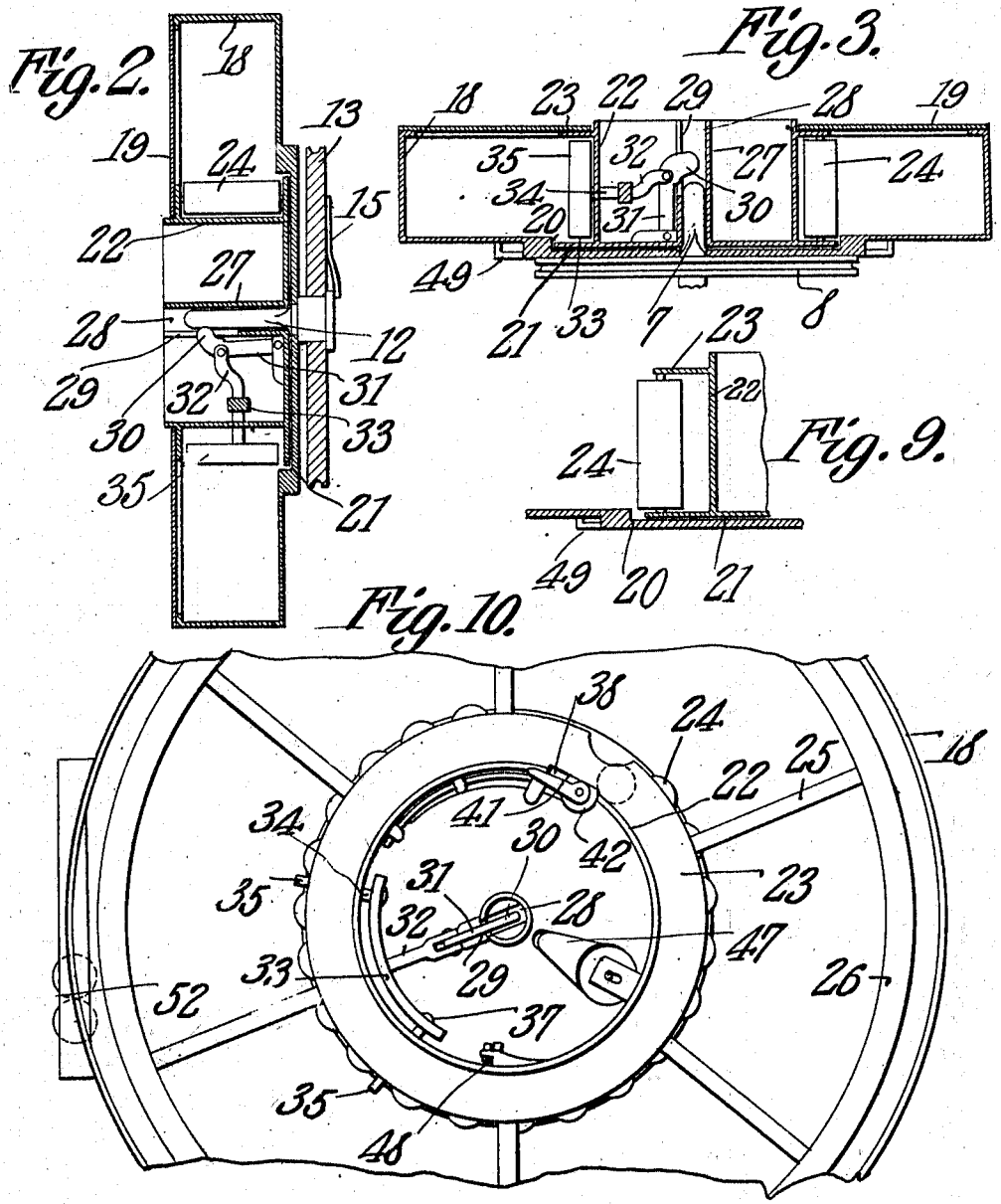

UNITED STATES PATENT OFFICE.

WALTER B. SWINDELL, OF RALEIGH, NORTH CAROLINA.

MOTION-PICTURE FILM-REEL MECHANISM.

970,570. Specification of Letters Patent. Patented Sept. 20, 1910.

Application filed June 19, 1909. Serial No. 503,195.

*To all whom it may concern:*

Be it known that I, WALTER B. SWINDELL, a citizen of the United States, residing at Raleigh, in the county of Wake and State of North Carolina, have invented a new and useful Motion-Picture Film-Reel Mechanism, of which the following is a specification.

This invention has reference to motion-picture film reel mechanisms and is designed to provide a mechanism for supporting motion-picture films while in use, whereby a film after passing in front of a projection lens is rewound in a fire proof case, the rewinding being automatic and progressing as the film is unwound from the initial reel, the structure being such that the receiving reel and casing therefor may be interchanged with the reel from which the film is unwound as it passes through the projection apparatus, the parts then being in position to repeat the operation without further delay.

In accordance with the present invention two identical reel structures are provided, and each structure is adapted to deliver the films from the inside of the film roll and to receive the film for rewinding in such manner that the incoming film shall always be received on the outside of the increasing film roll. When the entire film has passed from one reel to the other then the reels are interchanged and the film may be immediately re-passed through the projection apparatus without the necessity of rewinding the film, since, when wound upon the receiving reel, with the present apparatus, the wound film is ready to be withdrawn therefrom for passage through the projection apparatus in the proper order. Furthermore the wound-up film as it comes from the projection apparatus need not be exposed or removed from the receiving casing since the latter as a whole is interchanged in position with the casing from which the film was unwound to pass through the projection apparatus, the structure being such that when the film is unwound to proceed to the projection apparatus the casing is rotated while when the film is wound up after having passed the projection apparatus a receiving reel with its casing is rotated.

The invention will be best understood from a consideration of the following detail description taken in connection with the accompanying drawings forming a part of this specification in which drawings—

Figure 1 is a side elevation, partly structural and partly diagrammatic, of a film apparatus constructed in accordance with the present invention. Fig. 2 is a section on the line A—B of Fig. 1, but omitting the carrying arm. Fig. 3 is a similar section when the film carrier is in position to deliver the film to the projection apparatus. Fig. 4 is a plan view of the central portion of one of the film carriers, with parts broken away and in section, the scale being larger than that of the prior named figures. Fig. 5 is a detail view of one of the film guards. Fig. 6 is a detail view of a guide roller for directing the film to the projection apparatus. Fig. 7 is a detail perspective view of an antibinding mechanism used in connection with the winding of the film after passing the projection apparatus. Fig. 8 is a cross section through the hollow pivotal stem of the film reel and holder. Fig. 9 is a detail section through a portion of the film winding drum and the casing therefor. Fig. 10 is a plan view of the film carrier and its casing with the cover omitted.

Referring to the drawings, there is shown in Fig. 1 a lantern 1 which may be taken as typical of any suitable projection apparatus adapted for motion-picture machines. The mechanism for causing the passage of the films across the beam of light coming from the lantern is diagrammatically indicated at 2. It is customary to mount the projection apparatus and the film carriers upon a suitable base and such base is indicated in Fig. 1 at 3, although this showing is to be taken as illustrative only. At the front end of the base 3 are erected suitable supports 4 carrying brackets 5—6 the showing of which in the drawings is largely illustrative. On top of the supports 4 there is erected a post or stud 7, shown in Fig. 3, and this post or stud is flattened or non-circular, and may be quite flat as indicated in Fig. 8. This post is stationary and mounted on the top of the supports 4 so as to move about the post 7 as an axis is a pulley 8. Mounted on one side of the support 4 is another pulley 9 from which there may extend a belt 10 to the pulley 8 guide rollers 11 being utilized to properly direct the belt. Carried by the brackets 6 is a laterally projecting post 12, best shown in Fig. 2, and this post or spindle 12 is mounted in suitable bearings in the brackets 6 so that it may be rotated on its longitudinal axis. Mounted on the spindle 12 is a pulley 13 receiving power from the pulley 9 through a suitable belt 14. The spindle 12 is connected to the pulley 13 by means of a spring 15 or other slip connection which will cause the pulley and spindle to rotate together except when the rotation of the spindle is resisted by a force superior to the frictional engagement of the spring 15 with the face of the pulley 13. The purpose of this construction will appear hereinafter and the showing is to be taken as typical of any suitable slip connection and as not confining the embodiment of the invention to the particular structure shown in this respect. The spindle 12 is flattened or non-circular like the spindle 7 and the showing of the spindle 7 in Fig. 8 is agreeable to the cross sectional shape of the spindle 12 where it projects beyond the bracket 6. The bracket is formed with cross arms 16 near the outer end of which are tangential fingers 17 for a purpose which will presently appear.

There are provided two cylindrical casings 18, which in practice are made of non-inflammable material. These casings have a cylindrical peripheral wall of sufficient height to accommodate a roll of films and parts co-acting therewith. It is customary to make the bottom portion of the casing 18 in one piece with or permanently connected to the peripheral wall of the casing and the top member 19 may be in part or in whole movable or at least capable of being opened for the purpose of inspecting the interior of the casing. At the central portion of the bottom of the casing there is formed a depression 20 in which rests the head 21 of a hollow cylinder or drum 22 having at the other or open end a peripheral radial flange 23, the head 21 projecting in like manner from the peripheral wall of the drum 22. Between the projecting portion of the head 21 and the flange 23 there is mounted a circular series of spaced rollers 24 designed to directly receive the film to be wound thereon. Projecting from the flange 23 are radial spokes 25 carrying at their outer ends a rim 26 between which spokes and rim and the bottom of the casing 18 the film is wound. The rollers 24 are mounted to rotate freely and may be made of wood or other suitable material adapted to receive the film without injuring it.

At the center or axis of the drum 22 there is secured a hollow post 27 having a flat central passage therethrough indicated at 28 and adapted to receive either the post 7 or spindle 12. The outer or upper end of the post 27 is slotted in line with the passage 28 as indicated at 29 and entering this slot is the bent free end 30 of a lever 31 pivoted to the post 27 near the base thereof. The lever 31 is pivotally connected to a stem 32 projecting from one side of a yoke 33 at a central point thereof and this yoke is connected at the ends to stems 34 in turn connected to central points of blades 35. The yoke 33 is slotted at the ends as indicated at 36 for the passage of the pins 34 so that these pins may move longitudinally of the yoke 33, but are headed as indicated at 37 to prevent their escape from the slots. The pins 34 pass through suitable perforations in the walls of the drum 22 and the blades 35 project between adjacent rollers 24 of spaced pairs of rollers so as to move radially outward or be drawn radially inward with reference to a film wound around the circular series of rollers 24.

The post 7 is of such length that when a casing 18 is placed thereon until it rests upon the pulley 8, the outer end of the post does not reach to the inturned end 30 of the lever 31 and then any force applied to the blades 35 tending to move them toward the post 27 is unresisted. When, however, the casing 18 is placed upon the spindle 12, the latter is of such length as to engage the inturned end of the lever 31 and force the said lever outwardly with reference to the slot 29, this movement causing a radially outward movement of the blades 35 which therefore project between rollers 24 and into the casing space between these rollers and the inner face of the peripheral wall of the casing.

At one point the flange 23 is cut away for a distance as indicated at 38, at which point the rollers 24 are separated by a greater space than elsewhere in the circular series of rollers. Also at this point the wall of the drum 22 is cut away and on one side of the cut away space there is journaled a roller 39 while the space, indicated at 40, is normally closed by a gate 41 carrying a roller 42 at the outer edge. This gate is provided with guiding arms 43 movable through guides 44 fast on the corresponding wall of the drum 22 while a spring 45 tends to move the gate 41 in a direction to maintain the roller 42 in engagement with the roller 39 thus effectually closing the opening 40, but the spring 45 will yield sufficiently to permit a film to pass between the rollers 39 and 42 as will hereinafter appear. In order to manipulate the gate 42 at will a handle 46 projecting therefrom is provided.

Journaled to the inner wall of the drum 22 at an appropriate point, and at another appropriate point in the bottom member 21 of the drum is a conical roller 47, the axis of this roller being slanted. There is also located on the inner wall of the drum 22 a clamp member 48 for receiving one end of the film when the latter is to be wound in the casing. On the bottom of the casing there are formed eyes 49 suitably spaced and located to receive the fingers 17 upon the ends of the arms 16 of the bracket 6. There will usually be as many eyes 49 as there are fingers 17 and these fingers and eyes may be so related that the fingers when inserted in the eyes will clamp therein and so hold the casing firmly to the bracket 6, but not so firmly but that the casing may be readily removed from the bracket when so desired.

Let it be assumed that the apparatus is equipped with two drums 18 alike in all respects. Let it further be assumed that a roll of film is contained in the drum 18 mounted on the post 7 which latter is fixed against rotation and rises from the supports 4. The bracket 5 is shown as provided with suitable guiding rollers 50 for the film which, in Fig. 1, is indicated at 51. The bracket 5 and guide rollers 50 are to be taken simply as illustrative of means of guiding the film from the casing 18 to the film-actuating mechanism 2, it being understood that any suitable guiding mechanism may be employed for the purpose and that the invention is by no means confined to the structure shown in the drawings. The film 51 contained in the casing 18 between the series of rollers 24 and the inner wall of the periphery of the casing has the inner end, which is the end to pass first through the projection apparatus, carried between the rollers 39 and 42, thence around the roller 47 and thence over the guide rollers 50 or other guiding means to the mechanism represented at 2 whereby the film is carried in front of the projection lens of the lantern 1, and then the film is carried to the other casing which is mounted on the spindle 12. In the outer wall of each casing there is formed an opening similar to the opening 40 in the drum 22 and this opening is guarded by suitable guard rollers similar to the rollers 39 and 42 and one of these rollers is mounted on a spring-pressed gate similar to the gate 41. This structure is indicated generally at 52 and since the structure at 52 may be substantially the same as the structure shown in Fig. 5 it is deemed unnecessary to specifically show the structure. The frictional engagement between the bottom of the casing 18 resting on the pulley 8 and said pulley is sufficient to cause a rotative movement of the said casing 18, but because of the shape of the post 17 the hollow post 27 is held against rotative movement and consequently the drum 22 is also held still, thus holding the series of rollers 24 and the spider made up of the arms or spokes 25 and the rim 26 are also held against rotative movement. But the film 51 is being constantly drawn from the casing 18 mounted on the post 7, and as the pulley 9 is connected up by a suitable mechanism typified by the belt 53 to the operating mechanism of the projection apparatus, the casing 18 containing the film is given a rotative movement at substantially the speed of withdrawal of the film from said casing so that no special strain is put upon the film in its movement out of the said casing. The film, however, may slip on the bottom of the casing and so compensate for the increasing distance of the film from the axis of rotation as it is being withdrawn from the casing, the said casing having necessarily a constant rate of rotation. The other casing 18, that is, the one mounted on the spindle 12 is held stationary because of the engagement of the fingers 17 in the eyes 49, but rotative movement is imparted to the drum 22 because of the engagement of the spindle 12 in the post 27 of said drum, which spindle receives rotative movement from the pulley 13 through the spring 15 and the said pulley is rotated by the belt 14 coming from the pulley 9.

When the film is first threaded through the machine it is carried to the entrance mechanism 52 at the periphery of the drum 18 mounted on the bracket 6. From this point the film is carried across the interior of the drum and between the rollers 39 and 42, thence around the roller 47 and finally is secured in the clamp or latch 48. Since the drum 22 is given a rotative movement by the spindle 12 the film is drawn in through the entrance 52 into the interior of the casing 18 mounted on the bracket 6 and is caused to wind upon the rollers 24. But because of the length of the spindle 12 the blades 35 have been projected beyond the outer edges of the rollers 24 and into the path of the winding film. The result is that the film at these points is held out of contact with the rollers 24 and consequently does not wind tightly thereon. In order to properly wind the film without slack upon the rollers 24 of the drum 22 in the casing 18 mounted upon the bracket 6, the peripheral speed of this series of rollers as driven by the pulley 13 when the winding commences must be equal to the speed of the film past the optical axis of the lens. However, as the winding progresses the increasing diameter of the roll of film causes a corresponding increase in the peripheral speed and to compensate for this the connection between the spindle 12 and the pulley 13 is made sufficiently yielding to cause a slip to occur on a sufficient pull on the film, but the structure is such that this pull shall never become destructive. The rolling of the film into the casing 18 carried by the bracket 6 continues until the film is entirely exhausted from the other casing 18. Now in order to again pass the film through the projection apparatus it is only necessary to rotate the casing 18 on the bracket 6 in the reversed direction until the eyes 49 have been moved away from the fingers 17 when the casing 18 may be readily pulled off from the stem or spindle 12. The other casing 18 may be simply lifted from the post 7. The two casings are now interchanged, the empty casing being placed on the spindle 12 while the full casing is placed on the stem or post 7, resting on the pulley 11. When the full casing was taken off the spindle 12 the lever 31 was relieved from pressure and consequently the wings or blades 35 no longer press against the inner turn of the film roll and the latter therefore loosely encircles the series of rollers 24. The end of the film 51 engaged by the clamp or latch 48 may now be released and the film carried to the film feeding apparatus 2 and from thence carried to the empty casing 18 on the bracket 6 and carried through the same and connected to the clamp or latch 48 thereof in the manner already described. The apparatus is now ready for a repetition of the passage of the film through the projection mechanism, the film having been changed from the winding to the unwinding side of the machine without being removed from the fire proof casing or exposed in any manner.

It will be observed that by making the casings of fire proof material and providing automatic traps for the passage of the film through the outer wall of the casing and through the peripheral wall of the drum, the film within the casing is always protected from accidental destruction by fire.

What is claimed is:

1. In a motion picture machine, a film receptacle comprising a casing, and a drum interior to and concentric with the casing, both the drum and the casing being provided with film passages and automatic traps therefor in the walls concentric with the axis of rotation, and the drum and casing being capable of rotation independent one of the other.

2. In a motion picture machine, a film receptacle comprising a casing, a drum interior to and concentric with the casing, both the drum and casing being provided with film passages, a rotatable carrier for the casing on the unwinding side of the machine, a fixed member also on the unwinding side of the machine for holding the drum against rotation, a fixed support for the casing on the winding side of the machine, and a rotatable member also on the winding side of the machine for engaging and actuating the drum.

3. In a motion picture machine, a film receptacle comprising a casing, a film receiving drum interior to and concentric therewith, and film expanding members movable to increase the film receiving circumference of the drum.

4. In a motion picture machine, a film receptacle comprising a casing, a film receiving drum interior to and concentric with said casing, the drum and casing being relatively rotatable, and a film expander movable to increase the film receiving circumference of the drum.

5. In a motion picture machine, a film receptacle comprising a casing, a film receiving drum interior to and concentric with said casing, a film expander movable to increase the film receiving circumference of the drum, a hollow post at the axis of the drum having a non-cylindrical axial passage, connections from the film expander movable into and out of said hollow post, and a member adapted to enter the post and engage the connections from the film expander.

6. In a motion picture machine, a film receptacle comprising a casing, a drum interior to and concentric with the casing and having a film passage therethrough, a holder or clamp for one end of the film interior to the drum, and an automatic trap for the passage.

7. In a motion picture machine, a film receptacle comprising a casing, a drum interior to and concentric with the casing and having a film passage therethrough, and an automatic trap for said film passage.

8. In a motion picture machine, a film receptacle comprising a casing, a drum interior to and concentric with the casing and having a film passage through its walls, a holder or clamp for one end of the film interior to the drum, an automatic trap for the passage through the walls of the drum, and a guide roller for the film also contained within the drum.

9. In a motion picture machine, a film receptacle comprising a casing having a film passage through its peripheral wall, an automatic trap for said passage, a drum interior to and concentric with the casing and also having a film passage therethrough, the casing and drum being rotatable one relative to the other, an automatic trap for the passage through the drum, a circular series of rollers on and exterior to the drum, a film expander carried by the drum and movable against a film wound on the circular series of rollers, a post carried by the drum in the axis thereof, said post having a non-cylindrical axial passage, connections between the interior of the post and the film expander, a clamp for the end of the film carried by the drum interior thereto, and a guide roller also carried by the drum interior thereto.

In testimony that I claim the foregoing as my own, I have hereto affixed my signature in the presence of two witnesses.

WALTER B. SWINDELL.

Witnesses:
  E. HUME TALBERT,
  F. T. CHAPMAN.